(12) United States Patent
Wernberg

(10) Patent No.: US 6,619,025 B2
(45) Date of Patent: Sep. 16, 2003

(54) ECOLOGY VALVE AND SYSTEM IN AN AIRCRAFT ENGINE FUEL SYSTEM

(75) Inventor: Donald E. Wernberg, Rockford, IL (US)

(73) Assignee: Woodward Governor Company, Rockford, IL (US)

(*) Notice: Subject to any disclaimer, the term of this patent is extended or adjusted under 35 U.S.C. 154(b) by 0 days.

(21) Appl. No.: 10/024,692

(22) Filed: Dec. 14, 2001

(65) Prior Publication Data
US 2003/0110775 A1 Jun. 19, 2003

(51) Int. Cl.[7] ............................................. F02G 3/00
(52) U.S. Cl. ..................... 60/39.094; 60/741; 417/279; 239/119
(58) Field of Search ............................... 60/39.094, 741, 60/790; 417/279; 239/119

(56) References Cited

U.S. PATENT DOCUMENTS

| | | | |
|---|---|---|---|
| 2,892,309 A | * | 6/1959 | Sipin ........................ 60/39.14 |
| 4,206,595 A | * | 6/1980 | Cole ..................... 60/30.09 F |
| 5,528,897 A | * | 6/1996 | Halin ...................... 60/39.094 |
| 5,809,771 A | * | 9/1998 | Wernberg ................ 60/39.094 |
| 6,195,978 B1 | * | 3/2001 | Futa, Jr. .................. 60/39.094 |
| 6,385,962 B2 | * | 5/2002 | Futa, Jr. et al. .......... 60/39.094 |
| 2002/0184884 A1 | * | 12/2002 | McCarty ...................... 60/773 |

* cited by examiner

Primary Examiner—Charles G. Freay
Assistant Examiner—John F. Belena
(74) Attorney, Agent, or Firm—Leydig, Voit & Mayer, Ltd.

(57) ABSTRACT

The present invention is directed toward an ecology valve that drains working fuel to the sump chamber of the ecology valve upon engine shut down. The ecology valve has a piston slidable in the piston chamber between shut-off and run positions. The piston divides the piston chamber into a sump chamber and an actuation chamber. Upon engine shut down, the piston slides toward the shut-off position and suctions sufficient fuel from the fuel manifold into the sump chamber to prevent coking of the nozzles. Upon the next engine start up, the actuation chamber is pressurized which drives the piston toward the run position and returns fuel contained in sump chamber to the fuel manifold. A drain passageway opens and fluidically connects the actuation chamber to sump chamber when the piston is sliding toward the shut-off position which allows fuel contained in the actuation chamber to drain to the sump chamber.

38 Claims, 5 Drawing Sheets

ECOLOGY VALVE AND SYSTEM IN AN AIRCRAFT ENGINE FUEL SYSTEM

FIELD OF THE INVENTION

The present invention relates generally to aircraft engine fuel systems, and more particularly relates to ecology valves and systems of aircraft engine fuel systems.

BACKGROUND OF THE INVENTION

Ecology systems are used in aircraft fuel systems to reduce nozzle coking, reduce pollution, and prevent fuel draining into the combustion chamber (and thereby prevent clouds of smoke upon starting). Ecology systems work by purging excess fuel remaining in the fuel manifold upon engine shut down. Upon engine shut down, the ecology valve draws or sucks excess fuel into a temporary sump chamber under mechanical action of a spring. While the engine is not operating, the fuel is stored in the sump chamber. Upon the next engine start up, the stored fuel is returned to the fuel manifold under the actuation force of pressurized fuel provided by the fuel pump. Ecology valves that operate according to the above manner are disclosed in U.S. Pat. Nos. 5,809,771 to Wernberg and 6,195,978 to Futa, Jr., the entire disclosures of which are hereby incorporated by reference.

Current ecology valve technology requires a return of working fuel used for ecology valve actuation to the fuel tank or other upstream location. While this is not problematic in new aircraft engines and fuel systems, and retrofits for existing fuel systems that have a readily available fuel tank drainage line, it is problematic for existing aircraft fuel systems that do not have an available fuel tank drainage line. Adding drain lines to existing systems to prevent nozzle coking is undesirable because of the additional cost and weight.

BRIEF SUMMARY OF THE INVENTION

In light of the above, it is a general objective of the present invention to eliminate or reduce the return lines to the fuel tank or other upstream locations for ecology systems of aircraft fuel systems.

In accordance with these and other objectives, the present invention is directed toward an ecology valve that drains working fuel to the sump chamber of the ecology valve upon engine shut down. The ecology valve has a piston slidable in the piston chamber between shut-off and run positions. The piston divides the piston chamber into a sump chamber and an actuation chamber. Upon engine shut down, the piston slides toward the shut-off position and suctions sufficient fuel from the fuel manifold into the sump chamber to prevent coking of the nozzles. Upon the next engine start up, the actuation chamber is pressurized which drives the piston toward the run position and returns fuel contained in sump chamber to the fuel manifold. A drain passageway opens and fluidically connects the actuation chamber to sump chamber when the piston is sliding toward the shut-off position which allows fuel contained in the actuation chamber to drain to the sump chamber.

It is an aspect of the present invention that a novel mode switching valve is provided that communicates pumped fuel to the nozzles when the engine is running and blocks fuel flow when the engine is not operating. The mode switching valve blocks the drain passageway when the actuation chamber is filling with working fuel to allow fluid actuation of the ecology valve.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
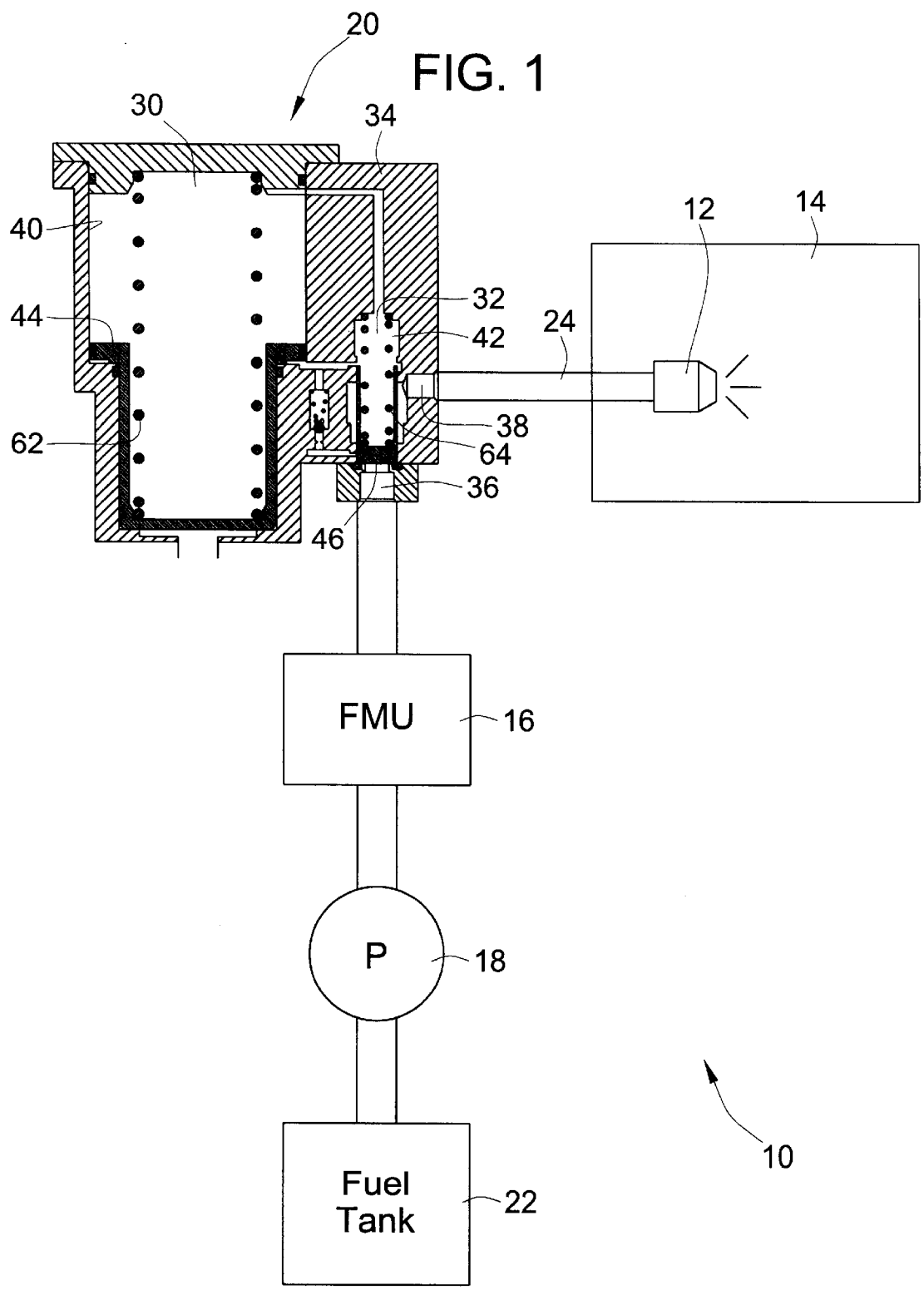
FIG. 1 is a partly schematic illustration of an aircraft fuel system having an ecology system.

Referring now to the drawings, FIG. 1 shows a partly schematic representation of an ecology valve 30 and ecology system 20 incorporated into the operating environment of an aircraft engine fuel system 10 constructed according to an embodiment of the present invention. The engine fuel system 10 comprises a plurality of fuel nozzles 12 arranged in a combustion chamber 14, a fuel metering unit 16, a fuel pump 18 and an ecology system 20. The fuel pump 18 typically comprises a boost pump and a high pressure gear pump. The fuel pump 18 draws fuel from the fuel tank 22 and pressurizes the fuel. The fuel metering unit 16 is typically located downstream of the pump 18. The fuel metering unit 16 typically includes a metering valve that receives fuel from the pump 18 and serves the function of metering fuel flow to the combustion chamber 14 (there have been proposals to incorporate and integrate the fuel metering unit and the pump such that a metering pump meters the fuel—the claims appended hereto are meant to include this possibility). The ecology system 20 is downstream of the fuel metering unit 16 and pump 18 and serves to drain the downstream fuel manifold 24 leading to the nozzles upon engine shut down, store fuel while idle, and then return fuel to the fuel manifold 24 upon the next engine start up.

Figure 2:
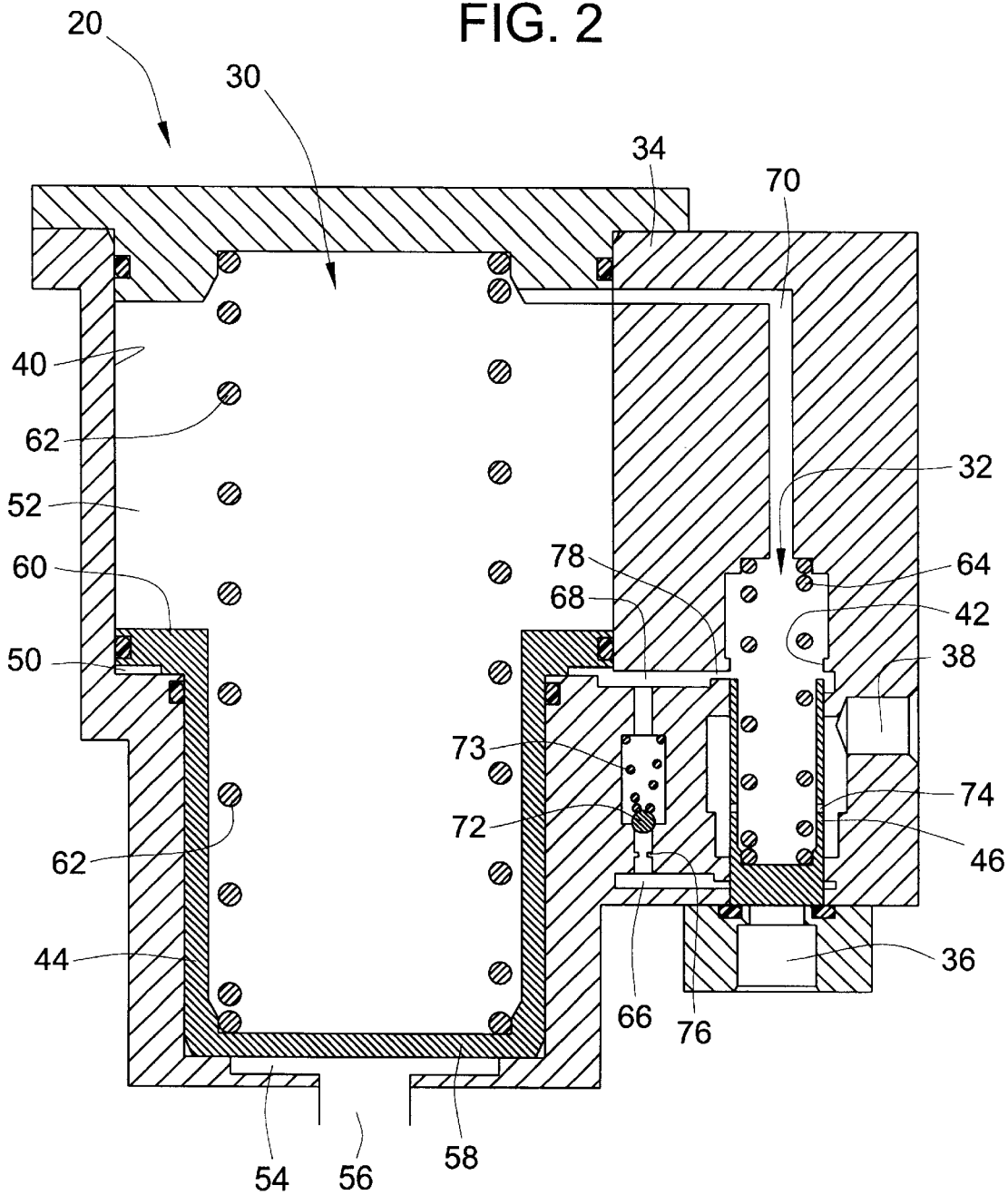
FIG. 2 is a cross section of the ecology system of FIG. 1 shown in a first state.

An embodiment of the ecology system 20 is better illustrated in FIGS. 2–5, with various operating stages being depicted among these figures. Referring to FIGS. 1 and 2, the ecology system 20 includes an ecology valve 30 and a mode switching valve 32 contained within a valve housing 34. The valve housing 34 includes an inlet port 36 for receiving pressurized fuel from the fuel metering unit 16 and an outlet port 38 that connects with the fuel manifold 24 and communicates pressurized fuel received at the inlet to the fuel manifold 24 when the engine is running. The valve housing 34 includes two cylindrical piston chambers 40, 42, including one for each of the ecology valve 30 and the mode switching valve 32. The ecology valve 30 includes a cylindrical piston 44 that linearly reciprocates in the first piston chamber 40. Similarly, the mode switching valve 32 includes a cylindrical piston 46 that reciprocates in the second piston chamber 42.

Figure 4:
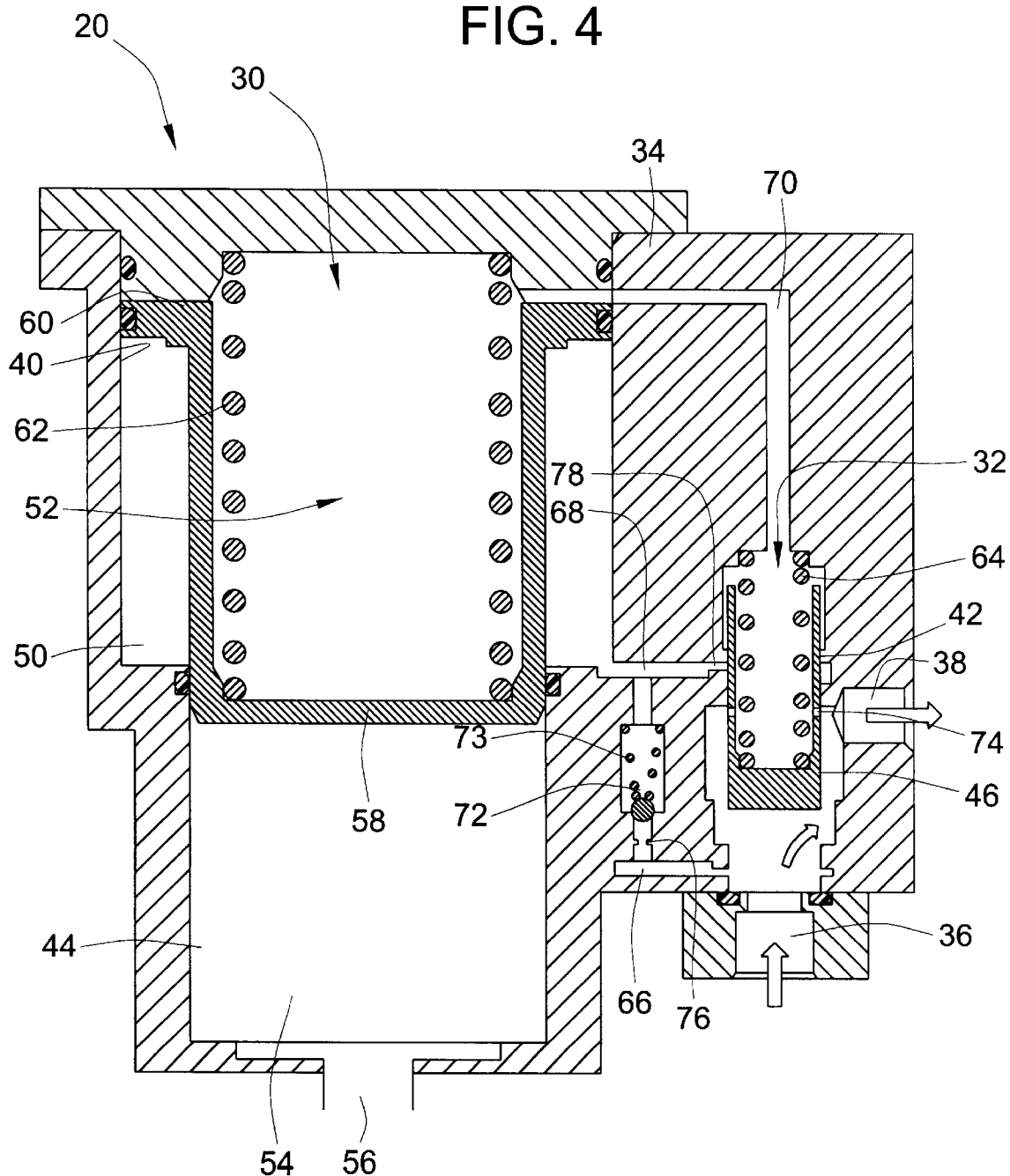
FIG. 4 is the same cross section of the ecology system of FIG. 2, but shown in a third state.

The ecology valve 30 includes an actuation chamber 50 and a sump chamber 52 on opposing sides of the piston 44. In the disclosed embodiment, the ecology valve 30 further includes an air chamber 54 that is connected to an overboard drain port 56 at atmospheric pressure, or, optionally may be vented to combustion chamber pressure. The air chamber 54 is on the same side of the piston 44 as the actuation chamber 50, but is separated by stepping the piston 44 with axially spaced piston lands 58, 60 that are of different diameters (and stepping the piston chamber 40 with different diameter bore sections). This provides the actuation chamber 50 with an annular ring shaped configuration. The ecology valve piston 44 slides between a run position as shown in FIG. 4 and a shut-off position as shown in FIG. 2. A spring 62 contained in the sump chamber 52 biases the ecology valve piston 44 toward the shut-off position.

Figure 3:
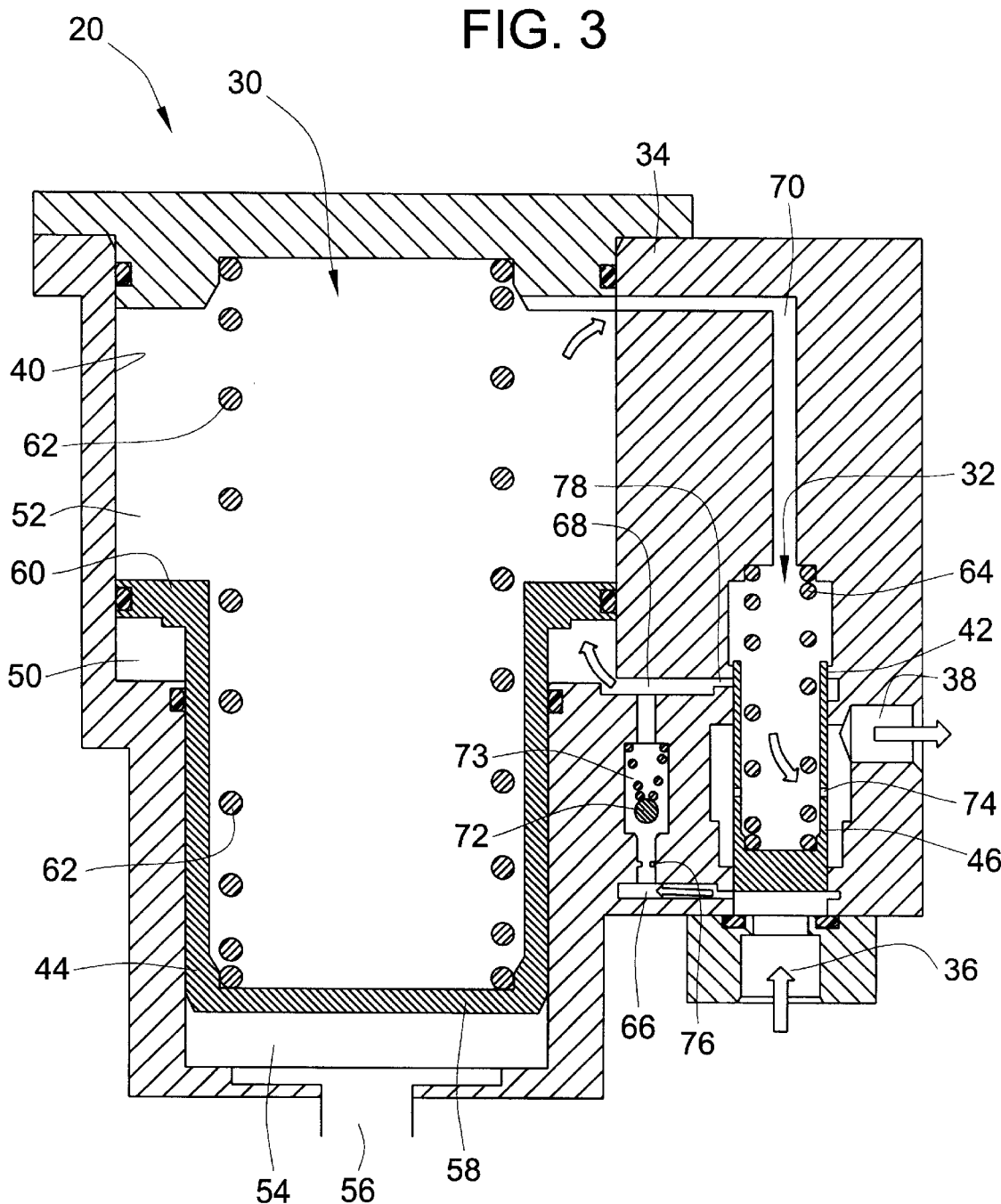
FIG. 3 is the same cross section of the ecology system of FIG. 2, but shown in a second state.

The piston 46 of the mode switching valve 32 slides between open and closed positions as shown in FIGS. 2 and 4. When the mode switching valve 32 is in the open position, fuel can readily flow from the inlet port 36 to the outlet port 38 as seen in FIG. 4. However, the mode switching valve 32 blocks fuel flow between the inlet and outlet ports 36, 38 when in the closed position shown in FIG. 2. A spring 64 biases the mode switching valve 32 to the closed position. As shown in FIG. 3, the mode switching valve may also include an intermediate position between open and closed positions.

The ecology system 20 has a number of fuel passageways 66, 68, 70 that are operationally arranged and selectively opened or blocked to provide for the novel operation of the ecology valve 30. An inlet passageway 66 is provided to fluidically connect the inlet port 36 to the actuation chamber 50. A drain passageway 68 is provided to fluidically connect the actuation chamber 50 to the sump chamber 52 when appropriate. A return passageway 70 extending through opening 74 is provided to fluidically connect the sump chamber 68 to the outlet port 38 and therefore the fuel manifold 24.

The operation of the ecology system 20 is generally illustrated in sequence in FIGS. 2–5. When the aircraft engine is not operating (and after a prior engine shut down as occurring in FIG. 5), the sump chamber 52 is expanded to its maximize volume and is full of fuel that has been previously suctioned into the chamber 52. The mode switching valve 32 is in the closed position under the force of the spring 64 and therefore blocking the flow path between the inlet and outlet ports 36, 38. In this position, the mode switching valve 32 may also block the inlet passage 66 leading to the actuation chamber 50 of the ecology valve 30. The drain passageway 68 remains open and fluidically connects the actuation chamber 50 and sump chamber 52. The return passageway 70 remains open and may fluidically connect the sump chamber 52 to the manifold in all positions or stages of operation.

At engine start up, the upstream fuel pump 18 begins to generate fuel pressure to the fuel metering unit 16 at the inlet port 36 of the ecology system 20. When sufficient pressure is generated, the piston 46 of the mode switching valve 32 is partly lifted off of its seat in the closed position shown in FIG. 2 to the intermediate position illustrated in FIG. 3. In this position, the mode switching valve 32 continues to block fuel flow between the inlet and outlet ports 36, 38. The piston 46 of the mode switching valve 32 now blocks the drain passageway 68 extending between the actuation chamber 50 and the sump chamber 52.

Just after blocking the drain passageway 68, the mode switching valve 32 then opens the inlet passage 66 and allows fuel to flow from the inlet port 36 through the inlet passage 66 and into the actuation chamber 50. A check valve 72 may be interposed along the inlet passage 66 to prevent back flow and ensure one way flow through the inlet passage 66 to the actuation chamber 50. The check valve 72 may have a spring 73 tending to keep the check valve 72 closed. Working fuel drawn from the inlet port 36 flows through the inlet passage 66 and into the actuation chamber 50 to drive the ecology valve piston 44 towards the run position. This occurs against the action of the spring 62 and thereby stores energy in the spring 62. Working fuel contained in the actuation chamber 50 cannot escape to the sump chamber 52 at this stage because the mode switching valve 32 has blocked the drain passageway 68. As the piston 44 being driven toward the run position, the ecology valve 30 is expelling fuel stored in the sump chamber 52 through the return passageway 70 and through the outlet port 38 to the fuel manifold 24. As shown in the disclosed embodiment, the return passageway 70 extends through the mode switching valve 32 to the outlet port and through ports 74 formed in the piston 46.

It should be evident at this point that the force of the spring 64 biasing the mode switching valve 32 closed has sufficient force to continue to block the flow path from the inlet port 36 to the outlet port 38 while the fuel stored in the sump chamber 52 is being returned to the fuel manifold 24. Because of size differences between actuation and sump chambers 50, 52 the amount of fuel discharged by the ecology valve piston 44 into the manifold 24 is greater than the fuel metered into as set by the fuel metering unit 16. This may not be desirable and can be remedied in one or more ways. Approaches to dealing with this issue during the start cycle may be to slow the movement of the ecology valve piston 44 sufficiently to minimize the effect on total flow to the manifold or to schedule fuel flow at a level as a percentage of the desired manifold flow (e.g. electronically at the fuel metering unit 16), so that the desired flow is supplied to start the engine for a predetermined period. In the illustrated embodiment, a selectively sized restriction 76 in the inlet passage 66 sets the charging rate for the ecology valve 30.

Eventually the ecology valve piston 44 finishes the operation of returning stored fuel to the fuel manifold 24 and bottoms out against the valve housing 34 as shown in FIG. 4. As metered flow increases, fuel pressure will build at the inlet port 36 and push the mode switching valve 46 open against the action of the spring 64 as is also shown in FIG. 4. This occurs at a predetermined pressure. This allows for the metered fuel flow to flow directly from the inlet port 36 through the outlet port 38 and manifold 24 for discharge through the nozzles 12 into the combustion chamber 14. This continues as long as the engine continues to run and pump fuel through the fuel system 10. The mode switching valve 32 and check valve 72 also continue to block the drain passageway 70 and thereby traps the working fuel in the actuation chamber 50. It should be noted that during engine operation and at high fuel demands, fuel may eventually seep out of the actuation chamber 50. During idling of the engine after the aircraft lands, fuel demands and pressure drops allowing the ecology valve to "recharge" if necessary with further working fuel entering the actuation passageway 66 and into the actuation chamber 50.

Figure 5:
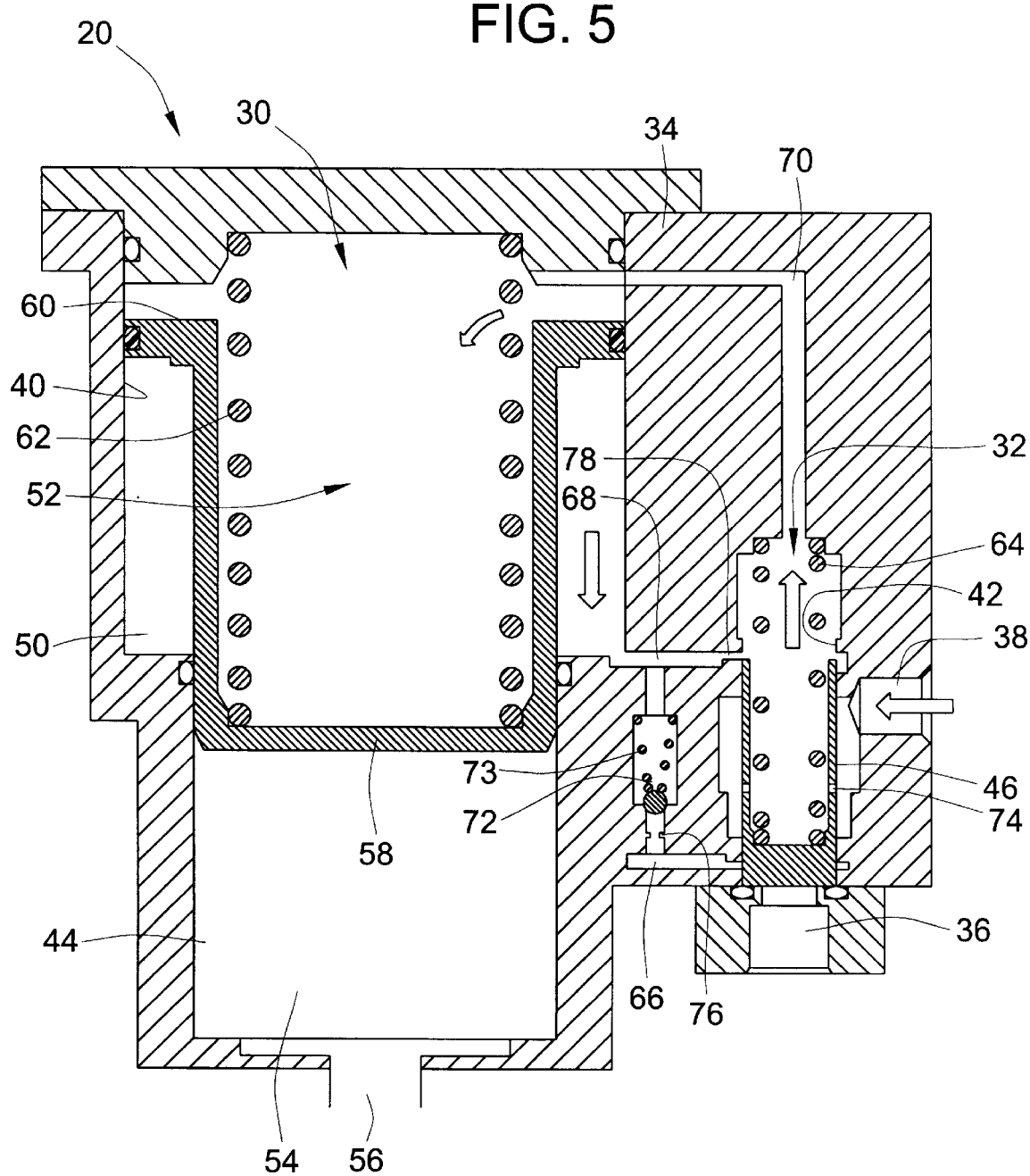
FIG. 5 is the same cross section of the ecology system of FIG. 2, but shown in a fourth state.

Upon engine shut down, fuel pressure rapidly diminishes at the inlet port 36 and the mode switching valve 32 closes assisted by the spring 64 acting on the valve piston 46, as shown in FIG. 5. This closes the fluidic connection between the inlet and outlet ports 36, 38 blocking fuel flow therebetween, and also removes the valve block of the drain passageway 68. This fluidically connects the actuation and sump chambers 50, 52. Because the working fuel in the actuation chamber 50 is no longer trapped the ecology valve 30 now operates. In particular, the loaded spring 62 pushes the ecology valve piston 44 towards the shut-off position. The piston 44 expels the working fuel from the actuation chamber 50 into the drain passageway 68 and simultaneously suctions fuel into the sump chamber 52. The drainage passageway 68 may connect with an extend through the return passageway 70 that is connected to the fuel manifold 24. Because the sump chamber 52 has a larger radial cross section and volume as compared with the actuation chamber 50, the ecology valve 30 is able to simultaneously suction both the working fuel and the fuel contained in the downstream manifold 24 into the sump chamber 52, thereby simultaneously draining the actuation chamber 50 and the downstream manifold 24 through port 74. The rate of piston 44 movement and ecology valve 30 suctioning is regulated by a restriction 78 interposed along the drainage passageway 68. The sump chamber 52 has a maximum storage volume or capacity that is about equal to the volume of fuel contained in the fuel manifold 24 and the volume of working fuel contained the actuation chamber 50 when full. This ensures that the fuel manifold 24 is adequately drained to prevent coking of nozzles as desired.

The ecology valve 30 finishes suctioning fuel into the sump chamber 52 upon returning to the shut-off position as shown in FIG. 2. The suctioned fuel is then stored in the sump chamber 52 until the next engine start up.

It is an advantage of the disclosed embodiment that working fuel contained in the actuation chamber 50 or other fuel in the downstream manifold 24 need not be returned to tank but is stored in the sump chamber 52 itself for immediate return for combustion upon the next engine start up. This avoids additional plumbing and lines leading upstream from the ecology system, thereby reducing weight and cost of the system. This also makes this system ideal for retrofit applications as it can be interposed along existing fuel lines between the fuel metering unit 16 and the combustion chamber 14. Single inlet and outlet port fuel connections are all that is required to hook the ecology system 20 into an existing fuel system (overboard drain or combustion chamber connections may also be needed for the air chamber of the ecology valve). Thus, a minimal amount of engine and airframe changes are required for retrofit applications. This system may also be used for new engines.

While an embodiment has been disclosed it will be appreciated that this system is not necessarily limited to a single manifold system in that it may be combined with the dual or more manifold purge system as shown in Wernberg, U.S. Pat. No. 5,809,771. In some cases, two or more specific ecology units could also be used for multiple manifold fuel systems.

All of the references cited herein, including patents, patent applications, and publications, are hereby incorporated in their entireties by reference.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A fuel system for use in an aircraft engine, the fuel system comprising:
   a fuel pump adapted to pressurize fuel from a fuel supply;
   a plurality of nozzles arranged in a combustion chamber;
   a fuel metering unit adapted to control the flow of fuel from the fuel pump to the fuel nozzles;
   a fuel manifold adapted to communicate the flow of fuel to the fuel nozzles;
   an ecology valve having a piston chamber, a piston slidable in the piston chamber dividing piston chamber into a sump chamber and an actuation chamber, the piston sliding between shut-off and run positions, the piston sliding toward the shut-off position upon engine shut-off and suctioning sufficient fuel from the fuel manifold into the sump chamber to prevent coking of the nozzles, pressurization of the actuation chamber driving the piston toward the run position returning fuel contained in sump chamber to the fuel manifold; and
   a drain passageway having an open state and fluidically connecting the actuation chamber to sump chamber when the piston is sliding toward the shut-off position allowing fuel contained in the actuation chamber to drain to the sump chamber.

2. The fuel system of claim 1, wherein the drain passageway has a closed state fluidically disconnecting the actuation chamber and sump chamber when the piston is sliding toward the run position.

3. The fuel system of claim 1, wherein the actuation chamber draws working fuel from the flow of fuel pumped by the fuel pump.

4. The fuel system of claim 3, further comprising a check valve between the actuation chamber and the flow of fuel from the fuel pump allowing one way flow of the working fuel from the fuel pump to the actuation chamber.

5. The fuel system of claim 3, further comprising means for regulating flow of working fuel to the actuation chamber.

6. The fuel system of claim 1, further comprising means for regulating the suctioning rate of fuel into the sump chamber.

7. The fuel system of claim 1, wherein the ecology valve further comprises a spring biasing the piston to the shut-off position.

8. The fuel system of claim 1, wherein the piston has first and second opposing faces, the first face being exposed to the sump chamber, a first portion of second face being exposed to the actuation chamber, a second portion of the second face axially spaced from the first portion being exposed to a vented air chamber.

9. The fuel system of claim 1, further comprising a mode switching valve, the mode switching valve movable between open and closed positions, the mode switching valve communicating the flow of fuel from the fuel pump to the fuel nozzles when in the open position, and fluidically disconnecting the nozzles from the fuel pump when in the closed position.

10. The fuel system of claim 9, wherein the mode switching valve blocks the drain passageway when in the open position and opens the drain passageway when in the closed position.

11. The fuel system of claim 9, wherein the mode switching valve has an intermediate position between open and closed positions, the intermediate position diverting fuel flow from the fuel pump to the actuation chamber when in the intermediate position.

12. The fuel system of claim 11, wherein the mode switching valve when in the intermediate position blocks the drain passageway and blocks fuel flow from the pump to the nozzles.

13. The fuel system of claim 12 wherein the mode switching valve fluidically connects the sump chamber to the nozzles in the intermediate position.

14. The fuel system of claim 9 wherein the mode switching valve includes a spring biasing the mode switching valve to the closed position.

15. An ecology system for a fuel system of an aircraft engine, the ecology system adapted to supply pressurized fuel to a fuel manifold during engine operation and suction fuel from the fuel manifold at engine shut-off, the ecology system comprising:
an inlet for receiving pressurized fuel;
an outlet for communicating pressurized fuel received at the inlet to the fuel manifold;
a mode switching valve movable between open and closed positions, the mode switching valve allowing fuel flow between the inlet and the outlet in the open position and blocking fuel flow between the inlet and the outlet in the closed position;
an ecology valve having a piston slidable in a piston chamber, the piston dividing piston chamber into a sump chamber and an actuation chamber, the piston sliding between shut-off and run positions in which the sump chamber is maximized and minimized, respectively, the ecology valve having a spring biasing the piston to the shut-off position; and
a drain passageway between the sump chamber and the actuation chamber, the mode switching valve blocking the drain passageway when in the open position and opening the drain passageway thereby fluidically connecting the sump chamber and the actuation chamber when in the closed position.

16. The ecology system of claim 15 wherein the ecology valve has an inlet passageway fluidically connected to the actuation chamber receiving fuel from the inlet.

17. The ecology system of claim 16 further comprising a check valve in the inlet passageway arranged to prevent fuel in the actuation chamber from flowing to the inlet.

18. The ecology system of claim 16 wherein the mode switching valve blocks the inlet passageway when in the closed position, fluidically disconnecting the actuation chamber from the inlet.

19. The ecology system of claim 18 wherein the mode switching valve has an intermediate position between open and closed positions, the mode switching valve opening the inlet passageway to the inlet and blocking fuel flow between the inlet and the outlet when in the intermediate position.

20. The ecology system of claim 15 further comprising a spring biasing the mode shut off valve to the closed position.

21. The ecology system of claim 15, further comprising a sump passageway fluidically connecting the outlet and the sump chamber.

22. The ecology system of claim 21 wherein the drainage passageway connects the actuation chamber and the sump chamber through the sump passageway.

23. The ecology system of claim 22 wherein the sump passageway is fluidically connected to the outlet through the mode switching valve.

24. The ecology system of claim 15, wherein the piston has a first and second opposing faces, the first face being exposed to the sump chamber, a first portion of second face being exposed to the actuation chamber, a second portion of the second face axially spaced from the first portion being exposed to a vented air chamber.

25. The ecology system of claim 15 wherein the sump chamber has a capacity when the ecology valve is in the shut-off position that is at least about equal to the volume of the fuel manifold and the volume of the actuation chamber when in ecology valve is in the run position.

26. The ecology system of claim 15 wherein the inlet comprising a single inlet connector and wherein the outlet comprises a single outlet connector.

27. A method for ecologically regulating fuel flow in a fuel system of an aircraft engine, the fuel system comprising a fuel pump adapted to pressurize fuel from a fuel supply, a plurality of nozzles arranged in a combustion chamber, a fuel metering unit adapted to control the flow of fuel from the fuel pump to the fuel nozzles, and a fuel manifold adapted to communicate the flow of fuel to the fuel nozzles, the method comprising:
providing an ecology valve fluidically connected to the fuel manifold, the ecology valve having a piston chamber, a piston slidable in the piston chamber dividing piston chamber into a sump chamber and an actuation chamber, the piston having at least two effective diameters to provide different working surface areas for the sump chamber and the actuation chamber;
actuating the piston with working fuel communicated into the actuation chamber and thereby return fuel contained in the sump chamber to the fuel manifold;
suctioning sufficient fuel from the fuel manifold into the sump chamber upon engine shut-down to prevent coking of the nozzles;
draining the working fuel from the actuation chamber into the sump chamber of the ecology valve upon engine shut-down; and
using a larger of the different working surface areas in the sump chamber to suction sufficient fuel from the fuel manifold while simultaneously draining the working fuel from the actuation chamber into the sump chamber.

28. The method of claim 27 further comprising storing all of the working fuel in the sump chamber upon engine shut down.

29. The method of claim 27 further comprising fluidically isolating the actuation chamber from the flow of fuel when the engine is running.

30. The method of claim 27 further comprising fluidically connecting and fluidically disconnecting the fuel pump to the nozzles when the engine is running and shut off, respectively.

31. The method of claim 30 wherein the drawing of working fuel to actuate the piston occurs while the nozzles are fluidically disconnected from the fuel pump, further comprising fluidically connecting the fuel pump to the nozzles after the piston has been actuated.

32. The method of claim 27 wherein said actuating comprises drawing working fuel from the flow of fuel.

33. The method of claim 27 further comprising fluidically disconnecting the sump chamber and actuation chamber when the piston is being actuated and returning fuel to the manifold.

34. An ecology system that is interposed between a fuel metering unit and a manifold supplying fuel to a plurality of nozzles of a combustion chamber of an aircraft engine, comprising:

an ecology valve having first spring loaded piston, the ecology valve suctioning fuel from the nozzles upon shutdown of the aircraft engine, storing fuel after shutdown, and returning fuel to the manifold and nozzles during startup of the aircraft engine; and a control valve having a second piston controlling fuel flow from the fuel metering unit through an inlet port, the second piston controlling fuel flow from the inlet port to a first port leading to the ecology valve and a second port connected to the fuel manifold, the second piston controlling movement of the first spring loaded piston with fuel flowing through the first port, the second piston allowing the supply of fuel to the manifold directly without passing through the ecology valve with fuel flowing through the second port; and a check valve between the control valve and the ecology valve providing one-way flow from the control valve to the ecology valve.

35. An ecology system that is interposed between a fuel metering unit and a manifold supplying fuel to a plurality of nozzles of a combustion chamber of an aircraft engine, comprising:

an ecology valve having a first spring loaded piston, the ecology valve suctioning fuel from the nozzles upon shutdown of the aircraft engine, storing fuel after shutdown, and returning fuel to the manifold and nozzles during startup of the aircraft engine; and a control valve having a second piston controlling fuel flow from the fuel metering unit through an inlet port, the second piston controlling fuel flow from the inlet port to a first port leading to the ecology valve and a second port connected to the fuel manifold, the second piston controlling movement of the first spring loaded piston with fuel flowing through the first port, the second piston allowing the supply of fuel to the manifold directly without passing through the ecology valve with fuel flowing through the second port; and wherein the ecology system is self contained having only two fuel connections including an inlet fuel connection at the inlet port and outlet fuel connection at the second port.

36. An ecology system that is interposed between a fuel metering unit and a manifold supplying fuel to a plurality of nozzles of a combustion chamber of an aircraft engine, comprising:

an ecology valve having a first spring loaded piston, the ecology valve suctioning fuel from the nozzles upon shutdown of the aircraft engine, storing fuel after shutdown, and returning fuel to the manifold and nozzles during startup of the aircraft engine; and a control valve having a second piston controlling fuel flow from the fuel metering unit through an inlet port, the second piston controlling fuel flow from the inlet port to a first port leading to the ecology valve and a second port connected to the fuel manifold, the second piston controlling movement of the first spring loaded piston with fuel flowing through the first port, the second piston allowing the supply of fuel to the manifold directly without passing through the ecology valve with fuel flowing through the second port; and wherein the ecology valve has an actuation chamber and a sump chamber separated by the first spring loaded piston, the ecology valve draining fuel from the actuation chamber to the sump chamber upon engine shut down.

37. The ecology system of claim 36 wherein the ecology valve further includes air chamber exposed to a portion of the piston, the air chamber being connected to one of an overboard drain vent and the combustion chamber.

38. The ecology system of claim 35 wherein the ecology valve suctions fuel from the manifold at a rate that prevents nozzle coking during and after shutdown and further includes means for allowing fuel to be metered to the engine at a desired fuel rate during engine start up.

* * * * *